United States Patent [19]

Yamanaka et al.

[11] Patent Number: 4,556,912
[45] Date of Patent: Dec. 3, 1985

[54] SOLID STATE IMAGE PICK-UP DEVICES

[75] Inventors: Seisuke Yamanaka, Mitaka; Masatoshi Sase, Atsugi; Osamu Yoshioka, Yokohama; Isao Kajino, Isehara, all of Japan

[73] Assignee: Sony Corporation, Tokyo, Japan

[21] Appl. No.: 521,968

[22] Filed: Aug. 10, 1983

[30] Foreign Application Priority Data

Aug. 10, 1982 [JP] Japan ................................. 57-137861

[51] Int. Cl.⁴ .................................................. H01N 3/14
[52] U.S. Cl. ..................................... 358/213; 358/228; 358/225; 358/55; 358/906
[58] Field of Search ............... 358/213, 212, 225, 228, 358/227, 55, 41, 335, 906, 209; 250/578; 357/24 LR

[56] References Cited

U.S. PATENT DOCUMENTS 4,489,350 12/1984 Kimura ............................... 358/213
4,504,866 3/1985 Saito .................................. 358/213

Primary Examiner—Gene Z. Rubinson
Assistant Examiner—Robert G. Lev
Attorney, Agent, or Firm—Hill, Van Santen, Steadman & Simpson

[57] ABSTRACT

A solid state image pick-up device comprises a matrix of first and second photo-sensitive elements, vertical shift registers disposed parallel to each other to shift charges from the first and second elements, respective transfer gates between each first and second element and the adjacent vertical shift register, and a horizontal shift register connected to one end of each of the vertical shift registers. An optical shutter is controlled such that the first and second elements are simultaneously exposed to incident light, and a system controller controls the transfer gates and the vertical and horizontal shift registers whereby equal predetermined maximum intervals are available for charging each of the first and second elements, the predetermined intervals being at least two frame periods long, but the starting time for charging for the first and second elements being relatively shifted by a predetermined interval, and reading of the signals from the first and second elements being performed sequentially in a frame period subsequent to closure of the shutter.

4 Claims, 10 Drawing Figures

SOLID STATE IMAGE PICK-UP DEVICES

BACKGROUND OF THE INVENTION

1. Field of the Invention

This invention relates to solid state image pick-up devices, and is particularly concerned with a video camera including a solid state image sensor for deriving a still image video signal.

2. Description of the Prior Art

It is known to provide a solid state image pick-up device including a solid state image sensor such as a charged coupled device (CCD), which can derive an output video signal during one field period or one frame period, so as to form one complete still image video signal.

If the CCD is of the so-called interline transfer type, the picked-up charge signals due to the irradiation of the incident light on photo-sensitive elements of the CCD are transferred to vertical shift registers continuously during each field or frame period. However, in this type of CCD, a so-called smearing effect or smearing noise can occur because some unwanted charges which are not picked-up or captured in the photo-sensitive regions leak out to the regions of the vertical shift registers. Such smearing is particularly likely to occur when incident light having a long wavelength, such as red light, is irradiated onto the CCD. The effect is to cause a blurred image when the signal is reproduced on a television receiver.

Moreover, dark-current noise can also occur, this being due to thermal excitation of electrons in the silicon substrate of the CCD. The extent of the thermal excitation depends on the thermal condition of the substrate and occurs even if the photo-sensitive regions are shielded from incident light by a shutter.

If the amounts of the dark-current charges accumulate in different photo-sensitive regions differ in successive fields, that is in successive odd and even field periods, then the output levels of the picked-up video signals, which are made up of the combination of the charges due to the incident light and the dark-current charges, will also differ. The dark-current has the effect of adding a direct current component to each video signal. In consequence, if the dark currents are different in odd and even field periods, the overall levels of the video signals will be different and this will cause flicker on a television receiver when the video signals are reproduced. This flicker will hereinafter be called flicker of the first kind.

Attempts have been made in the past to overcome both smearing and dark-current effects, but these have resulted in solid-state image sensors which are extremely complicated in structure and expensive to make because of the highly advanced techniques which are used in manufacturing them.

In the case of a video camera which is to produce a still image video signal for reproduction on a television receiver, the output video signal must be in the general form of a standard television signal such as an NTSC, PAL or SECAM signal. Thus, the output video signal of such a video camera should comprise a frame signal consisting of two field signals which are raster interleaved with each other in the usual way.

The need to have two field signals which are derived sequentially introduces a further problem of flicker when picking up an image of a moving object. This is because of the movement between the times of the two fields, which has the result that the video signals of the individual fields are spatially different from one another. This leads in particular to substantial deterioration in the vertical resolution of the reproduced picture. Hereinafter this will be called flicker of the second kind.

Thus flicker of the first kind causes luminance variations in the reproduced picture on a television receiver and flicker of the second kind causes spatially displaced images on the television receiver. Moreover, the smearing results in colour blurring and this is spatially non-uniform.

SUMMARY OF THE INVENTION

One object of the present invention is to provide a solid state image pick-up device which is capable of forming a still image video signal without flicker or dark-current noise.

Another object of the present invention is to provide a solid state image pick-up device in the form of a video camera to produce a still image video signal, and which prevents deterioration of the image quality resulting from smearing.

Yet another object of the present invention is to provide a solid state image pick-up device in the form of a camera having a shutter whereby the exposure time of the solid state image sensor can be controlled to effect still image pick-up.

According to the present invention there is provided a solid state image pick-up device comprising:

first and second photo-sensitive elements corresponding to odd and even fields of a television signal arranged alternately in a matrix;

a plurality of vertical shift registers mounted parallel to each other for shifting charges from said first and second photo-sensitive elements;

a plurality of transfer gates respectively disposed between said first and second elements and said vertical shift registers for shifting charges from said first and second photo-sensitive elements to said vertical shift registers;

a horizontal shift register coupled to one end of each of said vertical shift registers;

an optical shutter for controlling the irradiation of light on said first and second elements;

means for controlling said shutter to open so that said first and second elements are exposed simultaneously to said light; and controller means for controlling said transfer gates and said vertical and horizontal shift registers such that the maximum intervals available for charging each of said first and second photo-sensitive elements are the same and have a duration of at least two frame periods, the start times of said charging intervals for said first and second photo-sensitive elements respectively are relatively shifted by a predetermined interval, and the charges from said first and second photo-sensitive elements respectively resulting from said irradiation are read out sequentially after said shutter has closed.

Accordingly, in embodiments of the invention, the output video signals for each field and resulting from the picture scene and unavoidable dark-current components, are picked up sequentially from the image sensor device in such a way that the charges due to the dark currents are adjusted to be the same in each of the fields, so as to eliminate flicker of the first kind. Moreover, the spatial variation between the odd and even fields which gives rise to flicker of the second kind is eliminated, although the signals do of course differ to give the proper interline relationship.

Preferably, said output video signals are read out subsequent to clearing undesired residual electrons from the vertical shift registers, so that smearing can also be avoided.

The above, and other objects, features and advantages of this invention will be apparent from the following detailed description of illustrative embodiments which is to be read in conjunction with the accompanying drawings.

DESCRIPTION OF THE PREFERRED EMBODIMENTS

Figure 1:
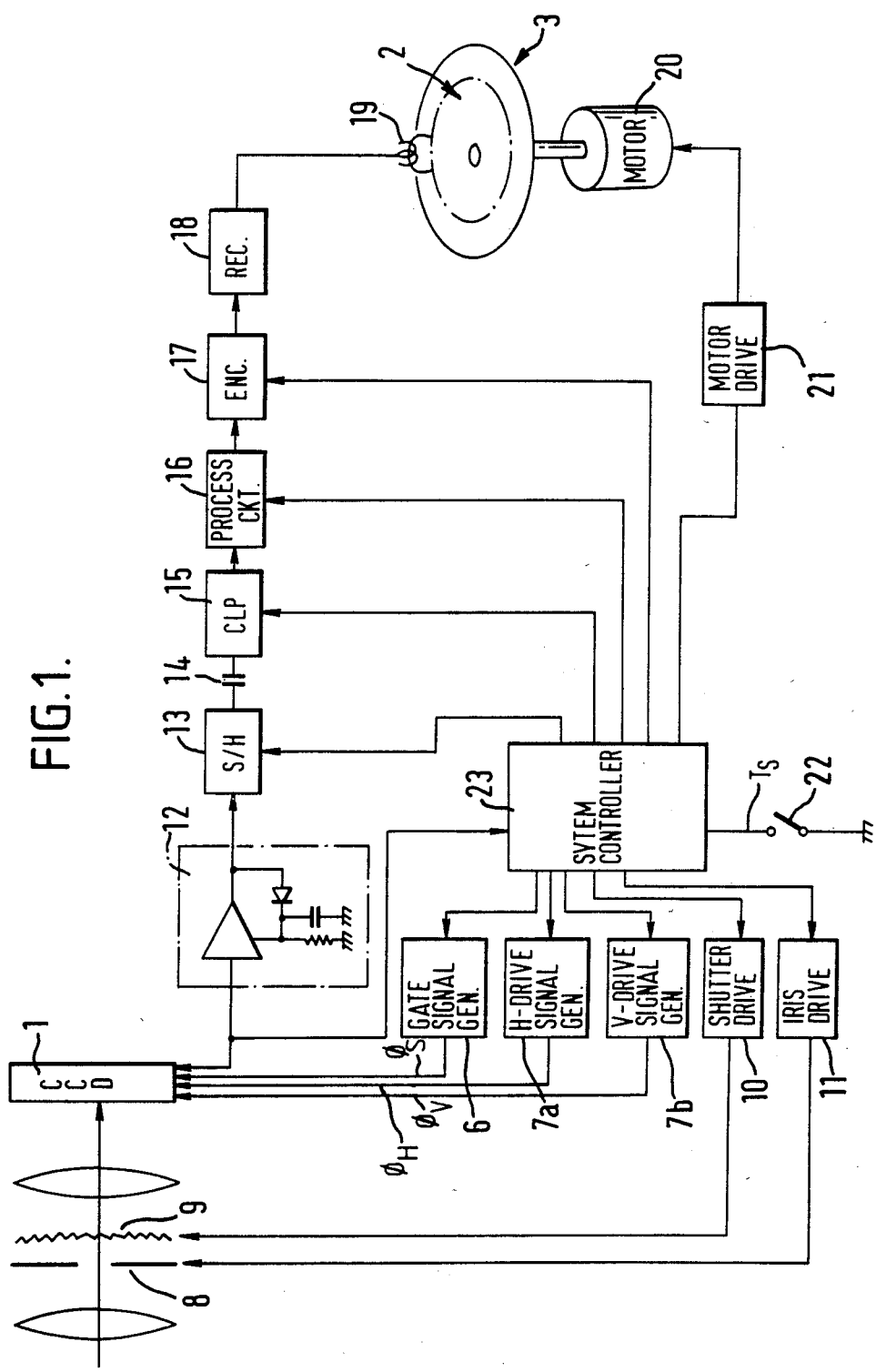
FIG. 1 is a schematic diagram of the general arrangement and circuit configuration of a video camera.

Referring to FIG. 1, the camera comprises a charge coupled device (CCD) 1 of the interline transfer type, from which a still image video signal is obtained as will be described in detail below. A video signal recording and reproducing section 3 records the picked-up video signal on a rotary magnetic disc 2 formed of sheet material and the video signal can be reproduced from the magnetic disc 2 so as to produce a still image on a television receiver (not shown). A system controller 23 controls the operation of the camera, including the CCD 1.

Figure 2:
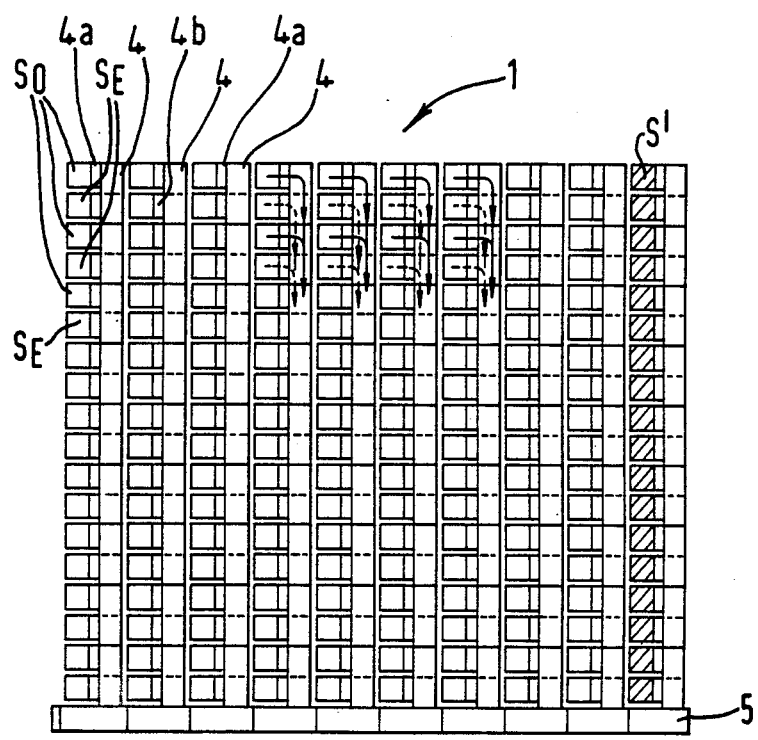
FIG. 2 is a plan view of a solid state image sensor used in the camera of FIG. 1.

As shown in FIG. 2, the CCD 1 comprises first and second photo-sensitive elements SO and SE alternately arranged in a matrix. The photo-sensitive elements SO correspond to odd fields and the photo-sensitive elements SE correspond to even fields, so the photo-sensitive elements SO are aligned horizontally and the photo-sensitive elements SE are aligned horizontally. The CCD 1 also comprises a plurality of bilateral vertical shift registers 4 which are disposed in vertical spaces between adjacent photo-sensitive elements SO and SE. Respective transfer gates 4a and 4b are disposed between the photo-sensitive elements SO and SE and the adjacent vertical shift register 4, to shift charges thereto. The CCD 1 also includes a horizontal output shift register 5 coupled to one end of each of the vertical shift registers 4.

Figure 3:
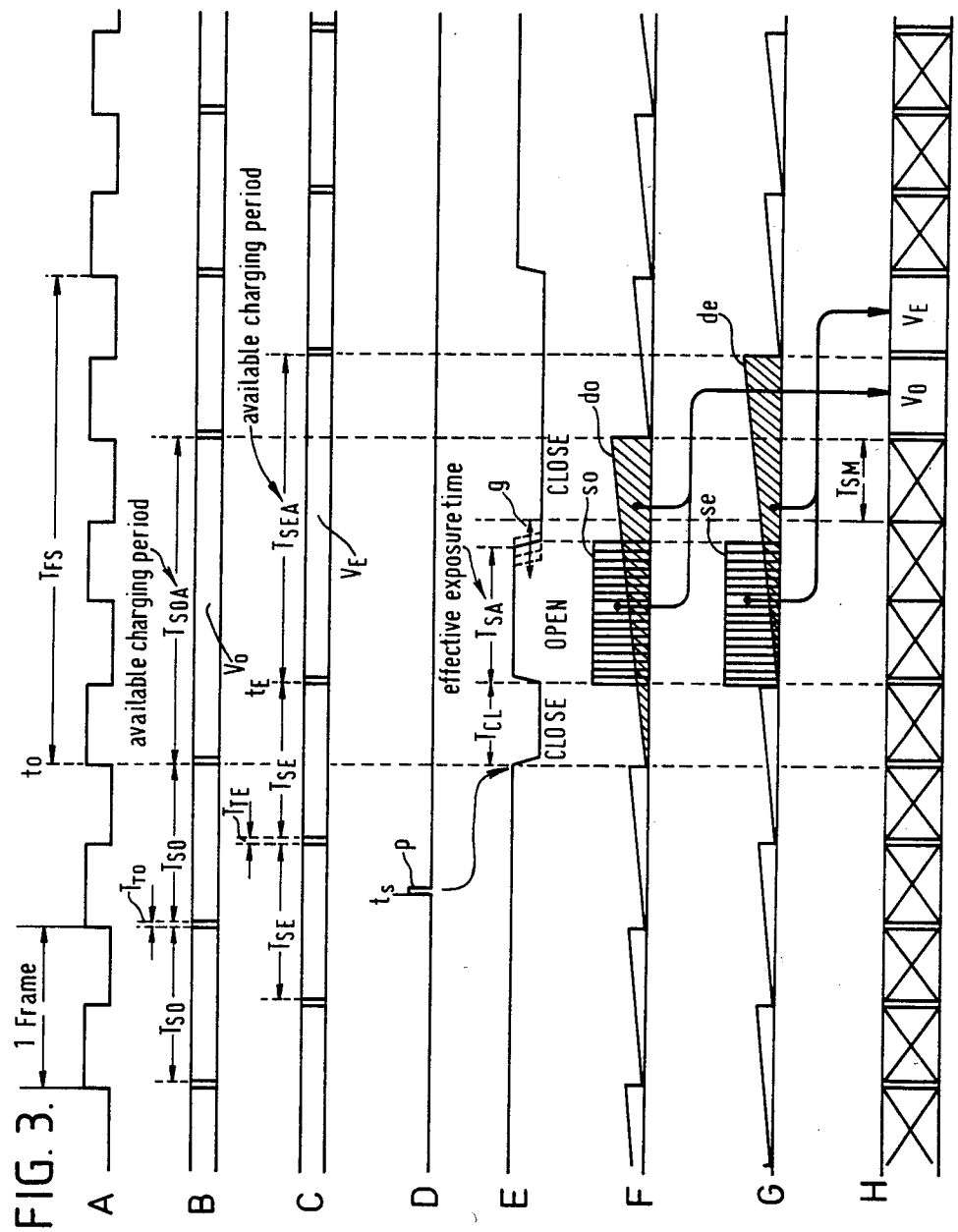
FIGS. 3A to 3H are time charts used in explaining the operation of the camera of FIG. 1.

The operation of the CCD 1 will be explained with reference also to FIG. 1 and the time charts in FIG. 3. The maximum intervals available for charging the first and second photo-sensitive elements SO and SE are set to have the same length, and the period may for example be two frame periods. The amount of charge in the sensor regions at the end of a charging interval depends on the intensity of the incident light, and is proportional to the amount of light irradiated on the sensor regions in the two frame period. The charges in the first and second photo-sensitive elements SO and SE are shifted to the vertical transfer registers 4 through the transfer gates 4a and 4b respectively. The solid line and dotted line arrows in FIG. 2 indicate respectively the flow of electrons from the sensor regions during the odd and even field transfers respectively.

The gating operation of the transfer gates 4a and 4b is controlled by gate signals $\phi_S$ generated by a gate signal generator 6. After this gating and transferring operation, the charges in the vertical shift register 4 are shifted successively line by line to the horizontal shift register 5 under control of a signal $\phi_V$ generated by a vertical drive signal generator 7b. The charges in the horizontal output shift register 5 are then read out as the output video signal under control of a signal $\phi_H$ generated by a horizontal drive signal generator 7a. These driving operations of the shift registers 4 and 5 are carried out in synchronism with the vertical synchronizing signals of a standard television signals such as an NTSC, PAL or SECAM system signal, which vertical synchronizing signals form a reference signal. FIG. 3A shows this reference signal, the cycle of which is equal to one frame period.

The gate signals $\phi_S$ generated by a gate signal generator 6 comprise two pulse trains generated alternately field by field for supply to the transfer gates 4a and 4b in the odd and even fields respectively of each frame. For the first photo-sensitive elements SO, corresponding to the odd field, the maximum available charging interval TSOA (FIG. 3B) of two frame periods is predetermined and for the second photo-sensitive elements SE, corresponding to the even fields, the maximum available charging interval TSEA is of the same duration, that is to say two frame periods, but does not start until half a frame period, that is one field period, later as shown in FIG. 3C. Comparison of the time charts of FIGS. 3B and 3C shows that the maximum available charging period for the first photo-sensitive elements SO starts at time $t_O$ and the maximum available charging period for the second photo-sensitive elements SE starts one field period later at time $t_E$.

The transfer gates 4a and 4b are periodically opened for short intervals TTO and TTE as shown in FIGS. 3B and 3C, and during these short intervals the charges in the photo-sensitive elements SO and SE are shifted to the vertical shift registers 4.

It is to be noted that the intervals TSOA and TSEA are the theoretical maximum available charging intervals and that the actual charging intervals are controlled by a shutter 9 as shown in FIG. 1. The shutter 9 is disposed together with an iris 8 in the light path of the CCD 1 and is controlled in dependence on the incident light to provide an adequate charging period for the sensor regions of the CCD 1. The operation of the shutter 9 is controlled by the system controller 23 through a shutter drive circuit 10, and the iris 8 is likewise controlled by the system controller 23 by way of an iris drive circuit 11.

The iris 8 is normally kept fully open and the shutter 9 is normally kept open, so that the incident light can pass therethrough, so enabling the light intensity to be detected. The shutter 9 is closed and the iris 8 set to the required value under control of the system controller 23. The system controller 23 is in turn controlled by a shutter-trigger pulse p triggered by closure of a shutter switch 22. When the trigger pulse p is supplied to the system controller 23 at the time $t_S$ as shown in FIG. 3D, the system controller 23 is activated so that just after the time $t_O$ synchronized with the odd field reference signal (FIG. 3A), this being the first frame start time following the time $t_S$, the control process is initiated so as to derive the output two-field still video signals VO and VE within a three frame period TFS (FIGS. 3H and 3A). A three frame period is necessary, due to the offset between the starting times $t_O$ and $t_E$ and the time taken for read-out. The two frame periods within which the charging of the photo-sensitive elements SO and SE can take place are determined by inhibiting the normal transfer operation of the transfer gates 4a and 4b until the ends of these periods.

The shutter 9 is closed at the time $t_O$ which is synchronized with the first leading edge of an odd field interval after the trigger pulse p and the shutter 9 is opened to start the operative exposure at the time $t_E$ synchronized with the trailing edge of the above odd field interval. That is to say, the closed interval TCL of the shutter 9 corresponds to the interval between the beginning of the odd-field charging time and the beginning of the even-field charging time of the photo-sensitive regions SO and SE. The shutter 9 is then closed not later than one field period before the end of the odd field available charging interval TSOA. Thus the effective exposure time TSA is variable from substantially zero to an acutal maximum of two field periods, which for a sixty field per second television system is 1/30 second. In other words, the effective exposure time TSA is variable, in dependence on the incident light, as indicated by an arrow g in FIG. 3E.

As a result of the above-described operation of the shutter 9 and the time control thereof, together with control of the iris 8, the appropriate amount of incident light is irradiated on the CCD 1, and moreover the incident light is irradiated on the first and second photo-sensitive elements SO and SE at the same time. Consequently, each field has the identical picture signal, although the picture is deviated by one line due to the interlace relation of the television signal. Because the exposure is at the same time, flicker of the first kind described above does not occur.

Moreover, because the maximum available charging periods TSOA and TSEA for the first and second photo-sensitive elements SO and SE respectively are the same, each having a duration of two frame periods, then even although the incident light is not irradiated on the first and second photo-sensitive elements SO and SE for the whole of these periods, the accumulated charges due to dark-currents in each of the photo-sensitive elements SO and SE are the same, and therefore flicker of the second kind described above is also eliminated. Thus, as seen in FIGS. 3F and 3G, the dark-current charges DO and DE accumulate substantially linearly with respect to time during the maximum available charging periods. These dark-current charges DO and DE are combined with the actual image signals SO and SC accumulated in the photo-sensitive elements SO and SE during the effective exposure time TSA, and then the combined image signals are read out as the output video signals VO and VE after a certain time interval TSM which is selected so as to prevent noise resulting from smear. In consequence, the total amounts of charge for each field are substantially the same because:

$$SO + DO = SE + DE$$

It should be noted that the output video signals VO and VE are read out while the shutter 9 is closed. Moreover, the output video signals VO and VE are read out at least one field period TSM after the end of the exposure time. During this period any unwanted charges, that is to say the smear noise charges for example, stored in the vertical shift registers 4 are swept out while the transfer gates 4a and 4b are maintained closed.

The read out video signals VO and VE are supplied to a sampling-hold circuit 13 through an amplifier 12, so that the output video signals VO and VE are sampled and smoothed. The smoothed signals are supplied through a DC-removing capacitor 14 to a clamping circuit 15 so as to be clamped at a suitable level.

As indicated in FIG. 2 the CCD 1 has a shielded portion so that at least one photo-sensitive element S' in each horizontal line is shielded from the incident light. This enables a reference black signal for use in adjusting the output video signals VO and VE to be obtained together with the image signal. The output video signals VO and VE are clamped in the clamp circuit 15 using this reference signal, and therefore the black level of the output video signals VO and VE are mainained at a required predetermined level and the black levels do not change undesirably in dependence on the input scene or variations in the camera. The clamp output signals from the clamp circuit 15 are then supplied to a processing circuit 16 in which gamma correction, and if the input signal is a color signal, a while balance correction are carried out.

The processed video signal is encoded into a suitable signal format for recording on the magnetic disc 2 in an encoding circuit 17 and is then supplied by way of a recording circuit 18, which may for example be an amplifier, to a video recording head 19 for recording on the magnetic disc 2. If the video signal is a color video signal, the encoding circuit 17 may derive and supply color different signals R-Y and B-Y line by line together with aluminance signal Y.

In the case of a 60 field per second television system, the magnetic disc 2 is driven at 60 revolutions per second by a motor 20 under control of a motor drive circuit 21 which in turn is controlled by the system controller 23 so as to be properly synchronized with the vertical shift signal $\phi_V$ from the V-drive signal generator 7b.

As described above the maximum period for which the shutter 9 may be opened is, in a 60-field per second television system, one 1/30, but if this interval is insufficient then longer exposure times can be made available by increasing the total processing interval TFS (FIG. 3A) from three frame periods to a longer interval, such as four frame periods. In this case the read-out of the output video signal VO and VE is of course shifted so as to be one frame period later than shown in FIG. 3H.

Although illustrative embodiments of the invention have been described herein with reference to the accompanying drawings, it is to be understood the invention is not limited to those precise embodiments, and that various changes and modifications can be effected therein by one skilled in the art without departing from the scope and spirit of the invention as defined by the appended claims.

We claim:
1. A solid state image pick-up device comprising:
first and second photo-sensitive elements corresponding to odd and even fields of a television signal arranged alternately in a matrix;
a plurality of vertical shift registers mounted parallel to each other for shifting charges from said first and second photo-sensitive elements;
a plurality of transfer gates respective disposed between said first and second elements and said vertical shift registers for shifting charges from said first and second photo-sensitive elements to said vertical shift registers;
a horizontal shift register coupled to one end of each of said vertical shift registers;
an optical shutter for controlling the irradiation of light on said first and second elements;

means for controlling said shutter to open so that said first and second elements are exposed simultaneously to said light; and controller means for controlling said transfer gates and said vertical and horizontal shift registers such that the maximum intervals available for charging each of said first and second photo-sensitive elements are the same and have a duration of at least two frame periods, the start times of said charging intervals for said first and second photo-sensitive elements respectively are relatively shifted by a predetermined interval, and the charges from said first and second photo-sensitive elements respectively resulting from said irradiation are read out sequentially after said shutter has closed.

2. A solid state image pick-up device according to claim 1 wherein before said charges resulting from said irradiation are read out from said first and second photo-sensitive elements said controller means causes any residual charges in said vertical shift registers to be swept out during an interval after said shutter has closed and before said read out.

3. A solid state image pick-up device according to claim 2 wherein said interval after said shutter has closed and before said read out is one field period.

4. A solid state image pick-up device according to claim 1 wherein said predetermined interval by which said start times of said charging intervals are relatively shifted is one field period.

* * * * *